United States Patent [19]
Matsuura

[11] Patent Number: 5,333,974
[45] Date of Patent: Aug. 2, 1994

[54] TRACER CONTROL UNIT
[75] Inventor: Hitoshi Matsuura, Hachioji, Japan
[73] Assignee: Fanuc Ltd., Yamanashi, Japan
[21] Appl. No.: 930,534
[22] PCT Filed: Feb. 5, 1992
[86] PCT No.: PCT/JP92/00116
§ 371 Date: Dec. 17, 1992
§ 102(e) Date: Dec. 17, 1992
[87] PCT Pub. No.: WO92/13676
PCT Pub. Date: Aug. 20, 1992

[30] Foreign Application Priority Data
Feb. 5, 1991 [JP] Japan ................. 3-035560
[51] Int. Cl.[5] ................. B23Q 35/14; G05B 1/00
[52] U.S. Cl. ................. 409/84; 318/578; 364/474.03
[58] Field of Search ............ 409/80, 99, 84, 132; 364/474.03; 318/577, 578

[56] References Cited
U.S. PATENT DOCUMENTS

| | | | |
|---|---|---|---|
| 4,658,127 | 4/1987 | Ferrari | 318/577 |
| 4,702,652 | 10/1987 | Rokksku et al. | 409/84 |
| 4,746,251 | 5/1988 | Yoshikawa et al. | 409/84 |
| 5,121,041 | 6/1992 | Matsuura et al. | 318/578 |
| 5,180,957 | 1/1993 | Matsuura et al. | 364/474.03 X |

FOREIGN PATENT DOCUMENTS

| | | | |
|---|---|---|---|
| 0074462 | 3/1983 | European Pat. Off. | |
| 161173 | 12/1979 | Japan | 409/99 |
| 59-42254 | 3/1984 | Japan | |
| 59-161252 | 9/1984 | Japan | |
| 59-192446 | 10/1984 | Japan | |
| 60-52238 | 3/1985 | Japan | |
| 2-274457 | 11/1990 | Japan | |
| 3-86446 | 4/1991 | Japan | |
| 3-86447 | 4/1991 | Japan | |

OTHER PUBLICATIONS

Patent Abstracts of Japan, vol. 9, No. 162 (M-394)(1885), Jul. 1985, & JP-A-60 34 253, Feb. 21, 1985.
Patent Abstracts of Japan, vol. 8, No. 249 (M-338)(1686), Nov. 15, 1984 & JP-A-59 124 552, Jul. 18, 1984.

Primary Examiner—William Briggs
Attorney, Agent, or Firm—Nikaido, Marmelstein, Murray & Oram

[57] ABSTRACT

Movement of a tool is delayed for a specified time from the movement of a tracer head that probes a model and traces the same path so that a cutter does not attain a state of excessive overshoot at a corner of a workpiece. The tracer head is driven independent of the tool on all axes of a machine tool by submotors provided in conjunction with feed axes of the tool. Profiling command values are stored in the FIFO memory 41 and output to the axes of the machine tool after being delayed for the specified time. In an operating circuit 43, speed command values Vxs to submotors are calculated based on the profile command values. The tracer head probes the model in precedence to the tool in response to the speed command values Vxs.

4 Claims, 3 Drawing Sheets

TRACER CONTROL UNIT

TECHNICAL FIELD

The present invention relates to a tracer control unit, more particularly a tracer control unit that controls a tracer head to trace a model preceding a cutter.

BACKGROUND ART

A conventional tracer control unit has carried out a tracer control subject so that the axes of a cutter of a copy machine tool are mechanically coupled to a tracer head. More specifically, the tracer control unit detects the amount of deflection of all axes of a stylus by the tracer head and the command values for the axes are calculated using these amounts of deflections in a trace computing circuit. Then with these command values, the cutter is relatively moved to a workpiece by driving the motors for the axes while the tracer head is moved at the same speed along a surface of a model. The tracer control for machining a workpiece in the same shape as the profile of the model is carried out by repeating the above operations.

In the case that a tool such as, for example, a cutter and a workpiece are to be moved in accordance with the tracer command values generated by the conventional tracer control unit, the tracer head and the tool are simultaneously driven with the feed axis drive commands thus generated and the tracer control unit has not been provided with a function for moving the tracer preceding movement of the cutter axis.

However, when the stylus provided on the tip of the tracer head collides with a corner or a similar part of the model during the tracing of the model, the tracer head bites the model for a moment, because the tracer head travels excessively because of effects such as the delay of the servo system that forms the driver of the tracer head and the inertia of the machine.

Consequently, the cutter also bites the workpiece as much as that of the tracer head and the machining accuracy at the corner of the model deteriorates. Accordingly, the conventional tracer control unit has a problem in that a part of the model where the profile is abruptly changed cannot be accurately traced.

DISCLOSURE OF THE INVENTION

An object of the present invention, which is made in consideration of the points described above, is to provide a highly accurate tracer control unit capable of delaying a tool for a certain specified time from the tracer head and tracing the model with the tracer head along the same path so that the cutter does not bite a workpiece.

The present invention provides a tracer control unit that allows a workpiece to be machined in the same shape as a model by driving a tool so that the tool moves along a trace of the stylus that is driven while maintaining contact with the model, comprising a plurality of first axis control means for driving the stylus, a plurality of second axis control means for driving the tool, control signal generating means for generating a plurality of control signals to be respectively supplied to the first axis control means so that the stylus is driven while maintaining contact with the model, and delay means for delaying the control signals generated by the control signal generating means for the specified time and supplying the delayed control signals to the second axis control means.

BEST MODE FOR CARRYING OUT THE INVENTION

Figure 1:
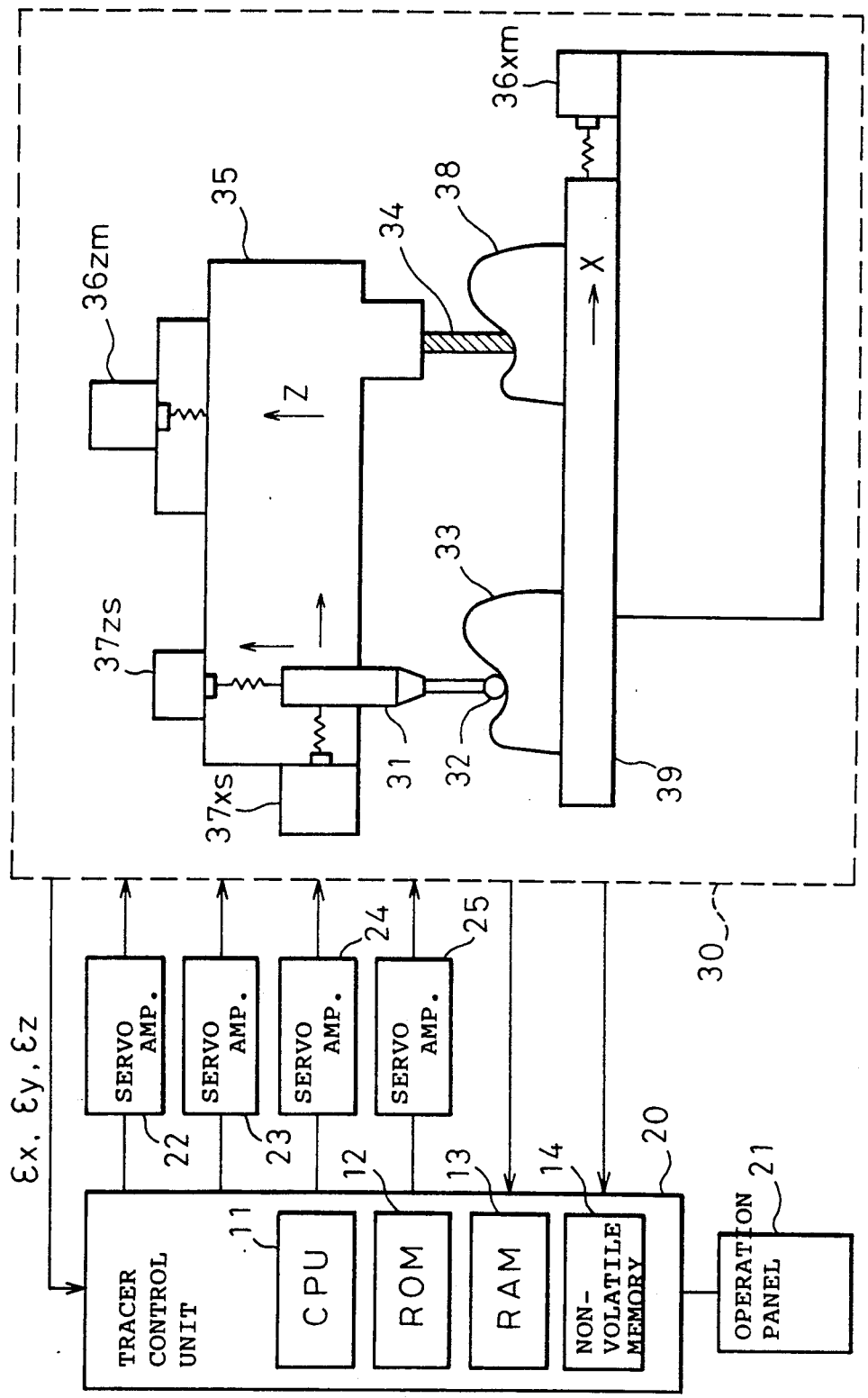
FIG. 1 is a block diagram showing the general configuration of the tracer control unit and the copying machine tool in accordance with the present invention.

FIG. 1 is a block diagram showing the general configuration of the tracer control unit and the copy machine tool in accordance with the present invention. In FIG. 1, the tracer control unit 20 has a CPU 11 for executing various operations such as trace computing, ROM 12 and RAM 13 for storing control programs and a non-volatile memory 14. The non-volatile memory 14 is backed up by a battery not shown and stores the parameters related to tracing direction and speed entered from the operator's panel.

Servo amplifiers 22 and 23 receive a feed axis drive command from the tracer control unit 20 and drive the main motors for X and Z axes. Servo amplifiers 24 and 25 receive an auxiliary axis drive command generated by the tracer control unit 20 and drive the sub motors for X and Z axes. The copy machine tool 30 is provided with the Y axis control system, not shown, as well as for X and Z axes to allow 3-dimensional copy machining and these three axial control systems are additionally provided with resective auxiliary axes being boosted by the feed axis in parallel formation. The tracer head 31 of the copy machine tool 30 detects the amount of deflection $\epsilon x$, $\epsilon y$ and $\epsilon z$ in the direction of the X, Y and Z axes that are generated when the stylus provided at the tip of the tracer head comes in contact with the model 33 and these values are input into the tracer control unit 20.

The cutter 34 is mounted on the column 35 and the column 35 is moved in the Z axis direction by the main motor 36$zm$. Submotors 37$zs$ and 37$xs$ are mounted on the column 35 and move the tracer head 31 in the direction of the X and Z axes and are boosted by a movement of the column 35. A workpiece 38 as well as the model 33 is fixed on the table 39 and the table 39 is moved by the main motor 36$xm$ in the X axis direction.

Main motors 36$xm$ and 36$zm$ rotate according to the feed axis drive commands V$xm$ and V$zm$, which are described later, and submotors 37$xs$ and 37$zs$ rotate according to the commands V$xs$ and V$zs$, which are calculated from the tracing speed command values and which differ from the feed axis drive commands V$xm$ and V$zm$.

Figure 2:
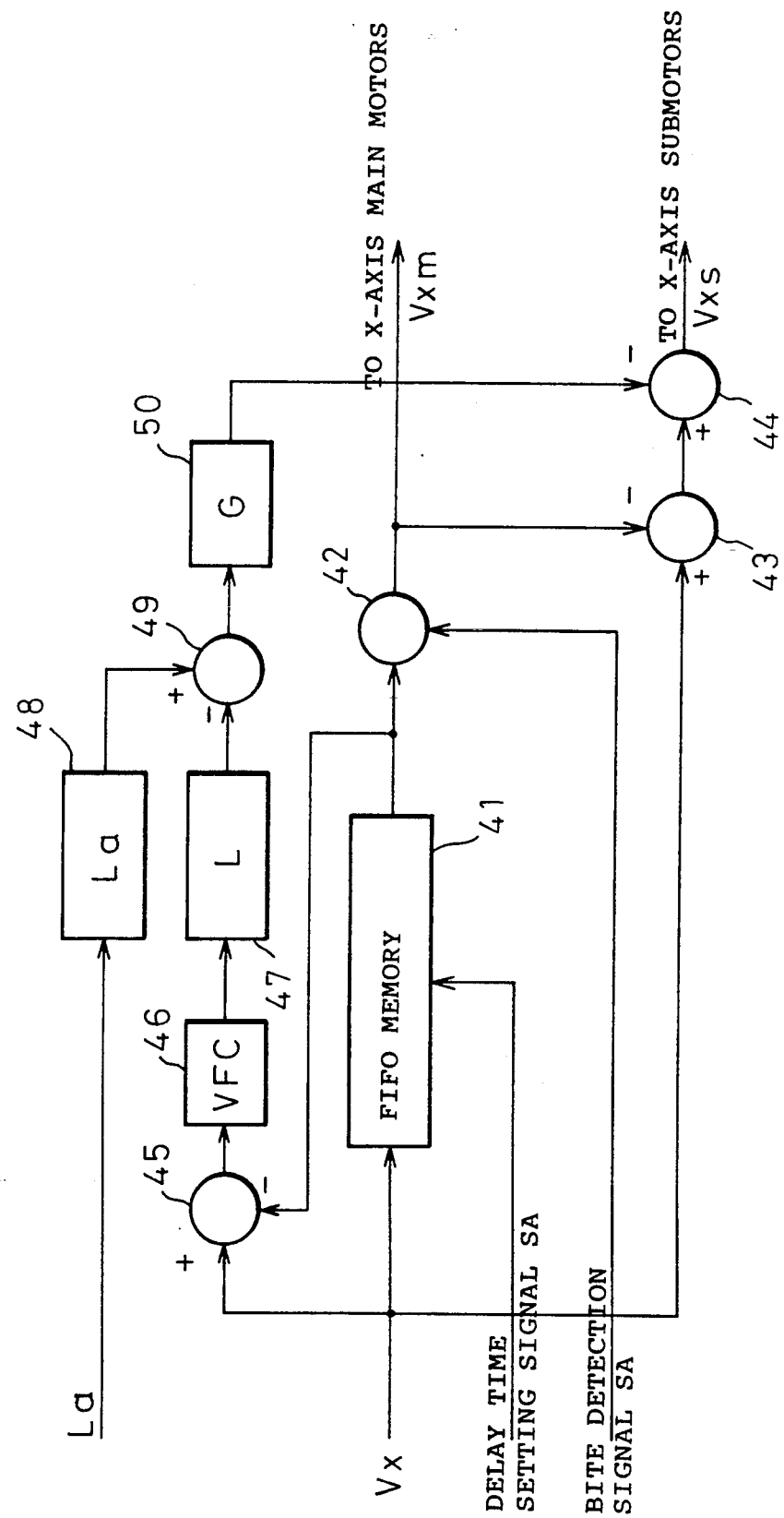
FIG. 2 is a block diagram showing the main control elements of the tracer control unit in accordance with the present invention.

FIG. 2 is a block diagram showing the main control elements for computing the speed command values V$xm$, V$ym$ and V$zm$ of the main motors and the speed command values V$xs$, V$ys$ and V$zs$ from the tracing speed command values V$x$, V$y$ and V$z$ computed by trace computing in the tracer control unit 20. These control elements may be realized by software processing in the tracer control unit 20 as well as the trace computing. In FIG. 2 although only a construction of the part corresponding to the X axis is shown, the control elements, for example, for the Y axis or the Z axis are similarly composed.

Tracing command value Vx is obtained from the amount of deflection detected in the tracer head (FIG. 1) by the known trace computing and entered into the FIFO memory 41. This FIFO memory 41 is the so-called first-in first-out storage means by which a series of the tracing command values Vx are stored as a plurality of data in the order of entry and the data is output from the first input data when the data overflows from the storage capacity. The tracing command value Vx is stored in this FIFO memory 41 for a given period of time and is output as an X axis drive command, which is delayed for a required time to the X axis main motor 36xm (FIG. 1) through an output control circuit 42. This time of delay is set according to a delay time setting signal ST that is externally given according to a distance along which the tracer head should move preceding the tool.

While a bite detection signal SA is supplied to the output control circuit 42, a zero is output as the speed command value Vxm regardless of the input value and the main motor 36xm is stopped. At this time, the main motors for other axes are also stopped. The biting of the tracer head 31 is detected by detecting that the maximum value of the derivative of the amount of deflection detected by the tracer head exceeds the reference value. Cancellation of the bite detection signal SA is described later.

In addition, the tracing command value Vx is entered as an addition signal to an arithmetic circuit 43. In this arithmetic Circuit 43, the X axis drive command value that is delayed in the FIFO memory 41 is subtracted from the tracing command value Vx and is output as the command value Vxs to the X axis submotor 37xs through an arithmetic circuit 44 for correction.

When the tracing command value Vx and others of all the axes that are separately calculated are thus output to the cutter side, a feed axis drive command from the FIFO memory 41 is delayed for a required time and output to the main motor 36xm, and movement of the tracer head 31 is controlled so as to be equivalent to the tracing command values by imparting movements relative to the cutter 34 to the submotors 37xs that carry out the control and is boosted by movements of the main motors. In other words, if the other input of the arithmetic circuit 44 for correction is tentatively assumed 0 (zero), the value obtained by subtracting actual drive commands from the tracing speed command values are supplied to the submotors 37xs, and thus the tracer head 31 precedes the movement of the cutter 34 as much as the specified command value of precedence and the traced movements accurately coincide with the traced movements according to the tracing speed command value, provided that the bite detection signal SA is not active.

Since tracing command values Vx are temporarily stored for a certain specified time in the FIFO memory 41 and supplied to the main motors through the output control circuit 42, the traced movements of the tracer head and the cutter may not temporarily coincide and the precedence value if the tracer head may not coincide with the commanded precedence value of the bite detection signal is generated and only the cutter is stopped by an operation of the output control circuit 42 or if the tracing con, hand values suddenly vary. For this reason, a signal for correcting the speed command value to the X axis submotors is formed and entered into the arithmetic circuit 44 for correction so that the distance (actual precedence value La), along which the tracer head actually precedes the tool, coincides with the commanded precedence value.

The following describes correction of the precedence value shown in FIG. 2.

An arithmetic circuit 45 is provided for subtracting the X axis drive command delayed by the FIFO memory 41 from the tracing con, hand value Vx, corresponding to the arithmetic circuit 43. The result of subtraction is entered into the register circuit 47 through the conversion circuit 46, which converts the speed command to the position command. Data stored in this register circuit 47 shows the current value of the precedence value L commanded by the tracer control circuit to the tracer head, which should precede movement of the cutter. On the other hand, the actual precedence value La of the tracer head is detected by the detector provided at each submotor for each axis and stored in the register circuit 48. The outputs of these two register circuits 47 and 48 are compared in the arithmetic circuit 49. In other words, the con, handed precedence value L as a subtraction signal and the actual precedence value La as an addition signal are entered into the arithmetic circuit 49 and thereby the correction signal for the X axis submotors is calculated as a difference between L and La. The output of the arithmetic circuit 49 is transformed to the subtraction signal for the arithmetic circuit 44 for the above correction by multiplying the output with the gain G in the multiplier circuit 50.

In the tracing control circuit according to the present invention, a feedback control is applied to the precedence value for each axis so that actual precedence value La always becomes equal to the commanded precedence value L and, therefore, even though only the main motors are temporarily stopped by the bite detection signal SA or the command speed based on the shape of the model suddenly varies, the tracer head and the cutter are controlled so that the traces of movements of the tracer head and the cutter can always be coincident and a specified delay time can always be maintained.

Figure 3:
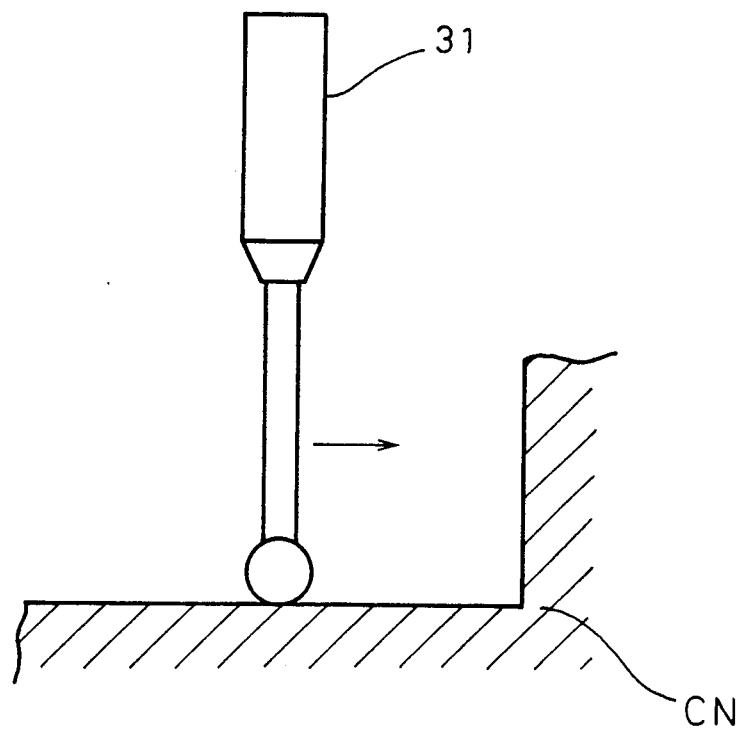
FIG. 3 is a block diagram showing a corner part of a model for copy machining.

As described above, in the copy machine tool 30 (FIG. 1), the cutter 34 passes a certain specified time later along the same trace as the path along which the tracer head 31 has passed under the control of the tracer control unit 20. Specifically, the tracer head 31 traces the model 33 in precedence to the cutter and therefore the fact that the tracer head 31 is in the bite state at a corner part CN in precedence to the cutter 34 as shown in FIG. 3 can be detected prior to cutting by the cutter 34. Accordingly, when bite occurs at the tracer head 31 side, the cutter 34 can be stopped so that the cutter 34 does not bite the workpiece 38.

In the present invention, as shown in FIG. 2, a preceding distance of the tracer head 31 is always detected as the actual precedence value La in the register circuit 48 and the movement of the cutter 34 is immediately stopped by entering the bite detection signal SA into the output control circuit 42 when the tracer head 31 is in the bite state. At this time, only the tracer head is not stopped and is driven according to the tracing speed command value and the commanded precedence value L corresponding to the tracing speed con, hand value is stored in the register circuit 47. In this case, the tracing speed con, hand value is calculated so that the commanded precedence value L is reduced in accordance with the degree of bite detected by the tracer head 31 and the difference from the actual precedence value La increases. Consequently, the con, handed precedence value L becomes 0 (zero) and the tracer head 31 is returned back to the position of the cutter, which is stopped according to the correction signal from the multiplier circuit 50.

The precondition for cancellation of the bite state is the detection of the fact that the absolute value of the actual precedence value La is lower than a certain specified value. The actual precedence value fed back to the register circuit 48 according to the above described correction signal quickly reduces and therefore the time that the cutter remains stopped is controlled so as to be minimal if the delay time in the FIFO memory is appropriately set with the delay time setting signal ST. Accordingly, biting of the workpiece 38 by the cutter 34 can be prevented, the stopping time of the cutter 34 is minimized, the bite state can be efficiently canceled and machining can be continued.

In the above process, the value of nominal velocity VN detected by the tracer head 31 may suddenly reduce along with sudden reduction of the transversal speed VT and the tracer control may be disabled. But, even when the value of VT is reduced, significantly a relatively large corrected speed is output and the tracer head is quickly set at the specified position by clamping the value of VN to the minimum value in the same manner as the known VN minimum clamp. Also the tracing speed command values Vx, Vy and Vz are reduced accordingly.

As described above, in the present invention, the auxiliary axes are provided to drive the tracer head independent of the tool axes and the tracer head is moved apparently according to the tracing speed con, hand value in precedence to the tool by the delaying movement of the controlled tool.

Specifically, the tracer head traces the model consequently in precedence to the tool according to this tracing speed command value. Therefore, the tool, which moves along the same path as the tracer head, is temporarily stopped after the tracer head bites the model at a part of which the shape suddenly changes and the cutter can be prevented from biting the workpiece. Therefore, highly accurate tracer control can be implemented without the bite of the cutter on the corner of workpiece.

I claim:

1. A tracer control unit for machining a workpiece in the same shape as a model by driving a tool so that said tool moves along the traced movement of a stylus that is driven while remaining in contact with said model, comprising:
    a plurality of first axis control means for driving said stylus;
    a plurality of second axis control means for driving said tool, wherein said first axis control means is operatively connected to said second axis control means;
    control signal generating means for generating a plurality of control signals to be supplied respectively to said first axis control means so that said stylus is driven while remaining in contact with said model;
    delay means for delaying the control signals generated by said control signal generating means for a specified time and supplying the control signals to said second axis control means; and
    a plurality of subtracting means for subtracting the control signals to be supplied to said second axis control means from the control signals generated by said control signal generating means and for supplying the signals obtained from said subtraction to said first axis control means.

2. A tracer control means in accordance with claim 1, further comprising detection means for detection the fact that said stylus bites said model, thereby generating a bite detection signal, and
    stop control means for stopping the control signals to be supplied to said second control means in response to said bite detection signal.

3. A tracer control unit in accordance with claim 2, further comprising
    commanded precedence value calculating means for calculating a commanded precedence value according to which a trace of said stylus precedes a trace of said tool from input and output signals of said delay means,
    actual precedence value detection means for detecting an actual precedence value of the trace of said stylus to the trace of said tool, and
    precedence value control means for controlling the value of control signals to be supplied to said first axis control means so that said actual precedence value coincides with said con, handed precedence value.

4. A tracer control unit in accordance with claim 3, wherein said bite detection signal is canceled when said actual precedence value is lower than a specified threshold value.

* * * * *